Patented Dec. 29, 1942

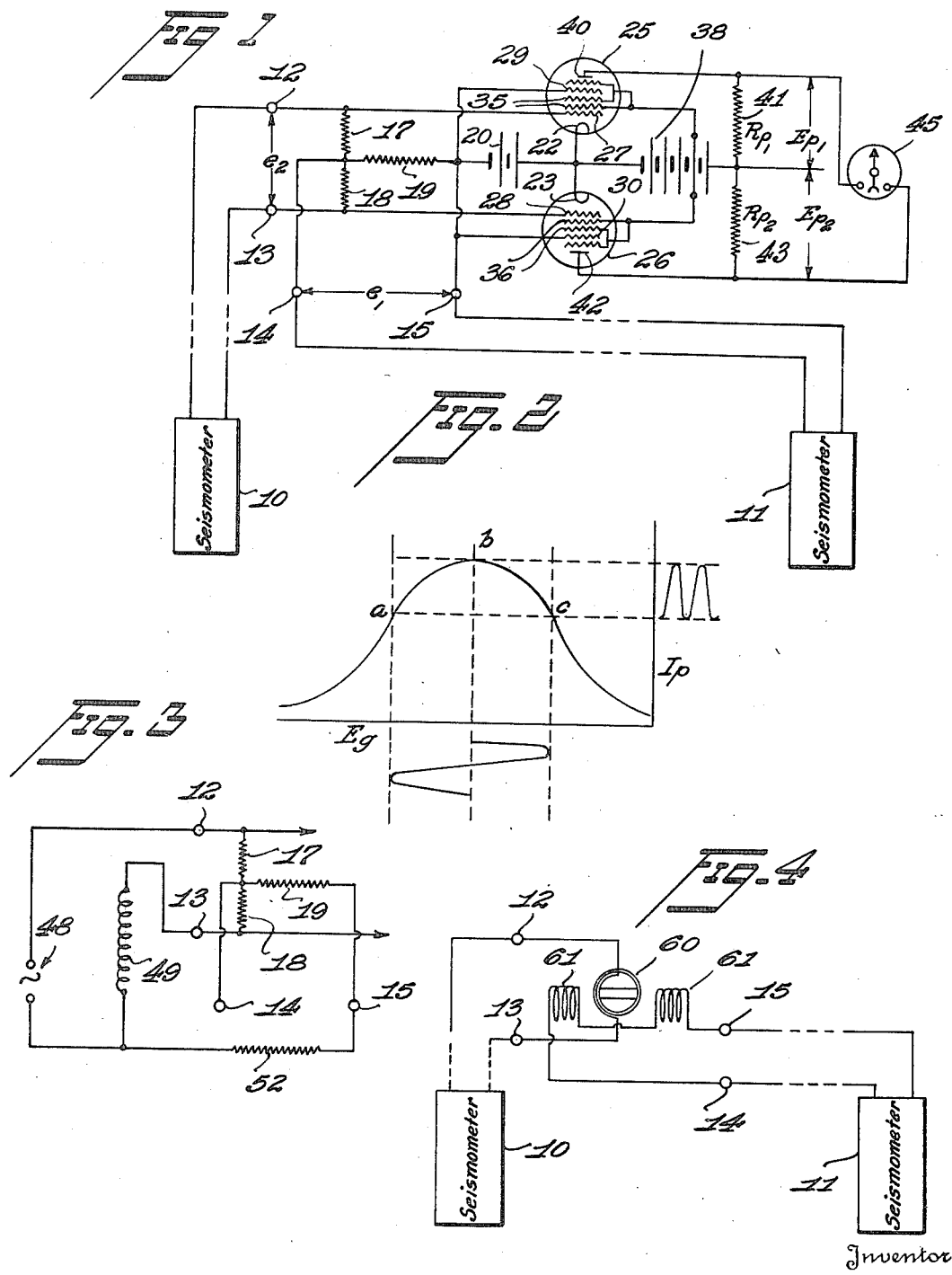

2,306,456

UNITED STATES PATENT OFFICE 2,306,456

MEASURING AND RECORDING APPARATUS

William Harry Mayne, San Antonio, Tex., assignor to Olive S. Petty, San Antonio, Tex.

Application June 1, 1940, Serial No. 338,439

6 Claims. (Cl. 177—352)

This invention relates to apparatus and methods for measuring and is particularly concerned with the measuring and recording of wave-form electrical energy. It is an object of the invention to provide means for obtaining an indication of the product of wave-form energy from two separate sources.

While in its broader aspect the invention is of general application, it finds an important use in the field of seismic surveying. Thus it is generally recognized that in the reception and recording of seismic impulses, vibrational energy which arrives substantially in phase at each of several reception points may usually be identified as reflected energy, and the record of such in-phase energy is therefore quite important. On the other hand, while it is highly desirable to eliminate random energy from the record, so as to simplify the record and facilitate study thereof, it is advantageous to record the less significant energy which does not arrive in phase at the several reception points.

It is therefore a further object of the instant invention to provide means for receiving, amplifying, and recording seismic energy in such manner as to discriminate against, but not necessarily to eliminate, energy which arrives at the several points of reception in out-of-phase relation. More specifically, it is an object of the invention to provide, in combination with a plurality of seismometers arranged at spaced points for the reception of the seismic impulses, means for obtaining an indication or record which is generally representative of the product of the wave energy received by two or more of the seismometers, whereby energy arriving in phase is emphasized with respect to out-of-phase energy. The latter is preferably indicated or recorded, but at a lower level, and the record may be so prepared as to show approximately the phase angle.

A further object of the invention is the provision of a thermionic valve circuit employing two valves each of which is adjusted to operate at the apex of a generally parabolic grid voltage-plate current ($E_g$—$I_p$) curve, the outputs of the valves being combined and fed to a galvanometer or similar measuring or recording device. By means of this arrangement it is possible to obtain a galvanometer deflection or record which is representative of the product of oscillating signal energy delivered to the respective valves by each of two seismometers, as hereinbefore proposed. The invention also contemplates the use of such a thermionic valve circuit for other purposes, for example the measuring and recording of an electrical load by supplying to the respective valves energy which is representative of the voltage and of the current applied to the load.

It is a further object of the invention to provide a method of improving seismic records which comprises recording energy which is representative of the product of wave-form energy derived from two spaced seismometers, either by means of the circuit hereinbefore described or by some more conventional instrumentalities for obtaining products of wave energy.

Further objects and features of the invention will be apparent from the following description taken in connection with the accompanying drawings, in which Figure 1 is a diagrammatic representation of an electrical circuit, indicating one method of applying the invention to the field of seismic surveying;

Figure 2 represents the $E_g$—$I_p$ curve of each of the thermionic valves included in the circuit shown in Figure 1;

Figure 3 is a diagram of a preliminary circuit capable of use with the thermionic valve arrangement shown in Figure 1, but illustrating the application of the invention to the measurement of electrical loads;

Figure 5:
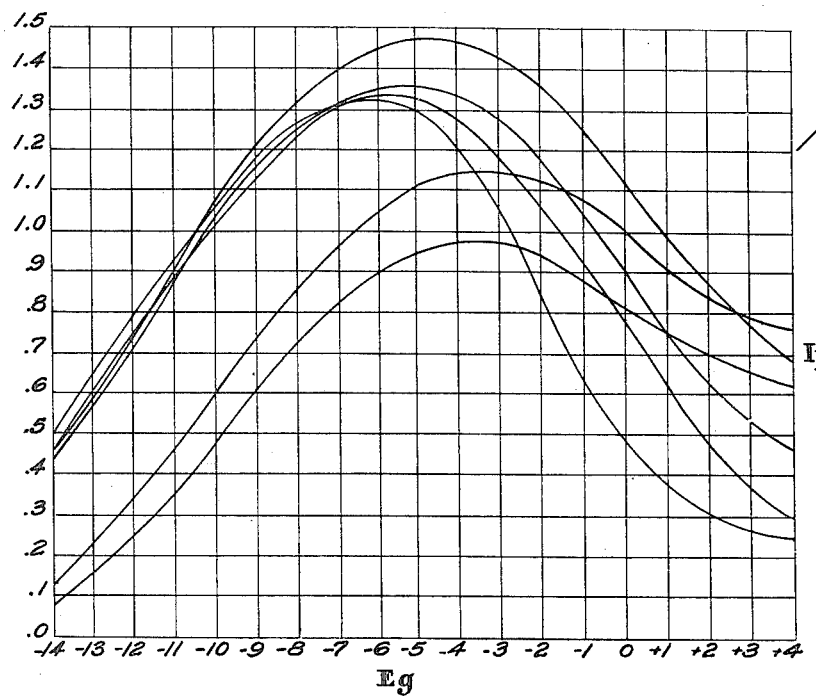
Figure 6:
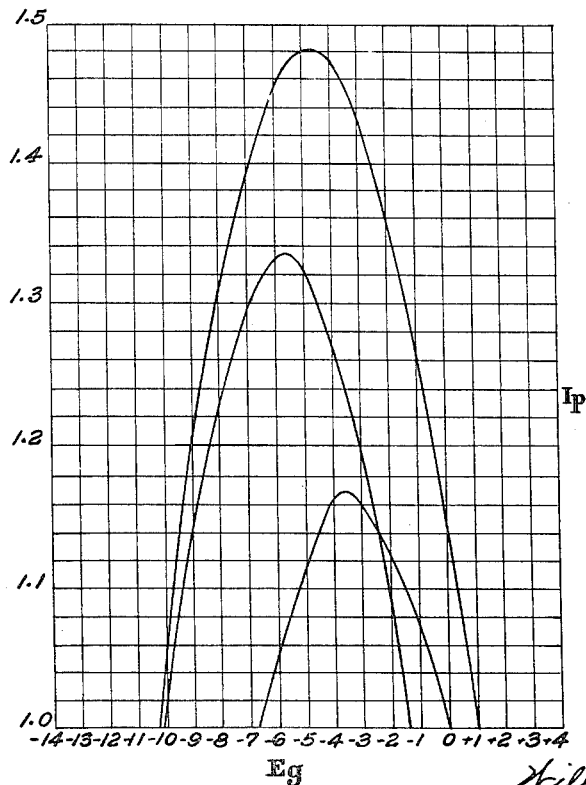

Figure 4 diagrammatically illustrates the application of the invention to the field of seismic surveying with the use of means other than that shown in Figure 1; and Figures 5 and 6 are characteristic curves of thermionic valves such as may be employed herein.

In order to facilitate an understanding of the invention, reference will be made to the several embodiments thereof illustrated in the accompanying drawings and specific language will be employed. It will nevertheless be understood that various further modifications of the devices illustrated herein, such as would fall within the province of those skilled in the art, to construct are contemplated as part of the present invention.

Referring now to Figure 1 of the drawings, it will be observed that spaced seismometers are diagrammatically represented at 10 and 11. These seismometers may be of any conventional type, constructed to provide an electrical output representative of the seismic wave-form energy arriving at the seismometer, for example energy such as is propagated following the detonation of an explosive charge in accordance with methods commonly practiced in the field of seismic surveying. Thus the seismometer may be constructed as disclosed in the application of Olive S. Petty, Serial No. 324,013, filed March 14, 1940, in which the seismic impulses are caused to vary the impedance of an oscillating circuit, and thereby the output of the circuit. The seismometers 10 and 11 may be spaced in the direction of propagation of the seismic energy, whereby energy traveling more or less horizontally arrives at different instants at the two seismometers, whereas energy reflected from considerable depths is substantially in phase.

The output of seismometer 10 is fed to terminals 12 and 13, and the output of seismometer 11 is fed to terminals 14 and 15. Equal resistances 17 and 18 are connected in series across terminals 12 and 13, terminal 14 being connected intermediate these resistances and thence through a resistance 19 and a source of grid bias voltage 20 to cathodes 22 and 23 of thermionic valves 25 and 26. Terminals 12 and 13 are also connected to control grids 27 and 28 of the respective valves. The negative terminal of grid bias source 20 is connected to grids 29 and 30 of the two valves, and each valve is provided with high voltage grids 35 and 36, the latter being connected to a tap on the source 38 of anode voltage, the negative terminal of this source being connected to the cathodes 22 and 23.

Anode 40 of valve 25 is connected to voltage source 38 through resistance 41, and anode 42 is similarly connected through resistance 43. An instrument 45, which may be a volt meter, string galvanometer, or other measuring or recording device, is connected to the two anodes, and thus measures the series voltage drop across resistances 41 and 43.

Valves 25 and 26 are caused to operate in such manner that the upper portions of the $E_g - I_p$ curves thereof are generally parabolic, for example as shown in Figure 2. Thus in this figure, the upper portion of the curve between the points $a$ and $c$ is generally parabolic, and the valves are normally biased so as to operate at the vertex $b$. It will thus be apparent that as the grid voltage varies between $a$ and $c$, the plate current will vary as the square of that voltage. It can be shown that the voltages applied at the terminals 12, 13 and 14, 15 are in effect multiplied, the voltage across the resistances 41 and 43 being proportional to the product of the input voltages. The explanation is briefly as follows.

If $E_{g_1}$ represents the voltage applied to the control grid 27 of valve 25 and $E_{g_2}$ represents the voltage applied to control grid 28 of valve 26, these being the instantaneous values, $e_1$ being the voltage across terminals 14, 15 and resistance 19, and $e_2$ being the voltage across terminals 12, 13 and series resistances 17, 18, the following equations may be derived.

$$E_{g_1} = e_1 + \frac{e_2}{2}$$

and $$E_{g_2} = e_1 - \frac{e_2}{2}$$

Since the grid voltage-plate current characteristic of the valves is a parabola, it follows that the plate current of each valve is proportional to the square of the applied control voltage. In other words, $$I_{p_1} = K_1 \left( e_1 + \frac{e_2}{2} \right)^2$$

and if resistance 41 be represented by $R_{p_1}$, and the voltage across this resistance by $E_{p_1}$, we have $$E_{p_1} = R_{p_1} K_1 \left( e_1 + \frac{e_2}{2} \right)^2$$

Similarly, if resistance 43 is indicated by $R_{p_2}$, we have $$I_{p_2} = K_2 \left( e_1 - \frac{e_2}{2} \right)^2$$

and $$E_{p_2} = R_{p_2} K_2 \left( e_1 - \frac{e_2}{2} \right)^2$$

Constants $K_1$ and $K_2$ are functions of the valves; therefore, for identical valves, $K_1 = K_2 = K$, and if resistances 41 and 43 are equal, we may write $R_{p_1} = R_{p_2} = R_p$. We then have $$E_{p_1} = R_p K \left( e_1^2 + e_1 e_2 + \frac{e_2^2}{4} \right)$$

and $$E_{p_2} = R_p K \left( e_1^2 - e_1 e_2 + \frac{e_2^2}{4} \right)$$

If the voltage across the galvanometer 45 is represented by $e_0$, we have $$e_0 = E_{p_1} - E_{p_2} = R_p K (2 e_1 e_2)$$

or $$e_0 = 2 R_p K (e_1 e_2)$$

Hence, since the characteristic of the valves is a true parabola, rather than a discontinuous half-parabola, if the instrument 45 is of the oscillograph type, the record will show a trace which is proportional to the instantaneous product of input voltages $e_1$ and $e_2$ at the terminals 14, 15 and 12, 13 respectively, with the advantage hereinbefore indicated that wave energy arriving at the seismometers 10 and 11 substantially in phase will be emphasized. Furthermore, the trace of such waves will be confined to one side of the zero axis for phase angles less than 90°, whereas for phase angles greater than 90°, the trace will remain predominantly on the opposite side of the zero axis, and it is thus possible to determine generally the phase relation of waves arriving at the two seismometers. Again, since the magnitude of the trace is proportional to the product of the two waves, wave energy substantially in phase will be approximately squared with resultant increase in amplitude, and will thus be much more apparent than simultaneously received random energy of slightly less magnitude and waves which are received out of phase. Nevertheless, there is no complete elimination of out-of-phase energy, and such energy may be recorded and appropriately interpreted.

When a D'Arsonval galvanometer having a long period as compared to the received frequencies is employed as the instrument 45, the true average power in an electrical load may be indicated by supplying the respective terminals 12, 13 and 14, 15 with voltages which are proportional to the current in the load and to the voltage across the load. This is illustrated in Figure 3 of the drawings in which is shown a simple method of applying such voltages to the terminals in question, the thermionic valve circuit being identical, and the same reference numerals being employed to indicate similar elements.

Thus in Figure 3, numeral 48 designates a source of oscillating or alternating electrical energy, this energy being delivered to a load represented by impedance 49. One terminal of the source 48 is connected to terminal 12, so that the impedance 49 is supplied through resistances 17 and 18, which are connected between terminals 12 and 13 as in the first described embodiment, terminal 13 being connected to one end of the impedance, and the other end of the impedance being returned to the source 48. If the values of resistances 17 and 18 are low, the drop across these resistances will be representative of the current flowing in the impedance. One end of the impedance 49 is also connected through a high resistance element 52 to terminal 15, and thence through resistance 19 to the point of connection between resistances 17 and 18, as in Figure 1. Since resistance 18 is low, the drop across resistances 19 and 52 will represent the voltage applied to the terminals of the impedance 49. In other words, the voltage across terminals 12 and 13 is representative of the current flow in the circuit to be measured, whereas the voltage across terminals 14 and 15 is representative of the voltage applied to the impedance 49. From the foregoing description it will be apparent that the outputs of the thermionic valves 25 and 26, if constructed and arranged as hereinbefore proposed, will supply to the galvanometer 46 a voltage which represents the true average power applied to the load 49, with proper adjustment of the values of resistances 17, 18, and 19.

Turning now to Figure 4, it will be observed that this figure illustrates one method of employing the principles of the instant invention in seismic surveying without the use of the special circuit hereinbefore described. Thus it is possible, as hereinbefore mentioned, to practice the invention with the use of conventional instrumentalities for indicating and recording a product of energy derived from two sources. In Figure 4 the instrumentality chosen is a meter of the moving coil type. Thus the moving coil, indicated at 60, is supplied with the output of seismometer 10 through terminals 12 and 13, and fixed coils 61 receive through terminals 14 and 15 the output of seismometer 11. The deflection of the movable coil 60 will then be proportional to the products of the outputs of the two seismometers with the attendant advantages hereinbefore described, and a record may be derived from the moving coil in any conventional manner, the in-phase wave energy being emphasized as hereinbefore pointed out.

It will be appreciated that the arrangement shown in Figures 1 and 4, representing circuits which are capable of deriving a product of the output of two or more seismometers will function effectively even though these seismometers are not spaced in the direction of propagation of the seismic impulses. Thus it is highly unlikely, in a system employing a number of seismometers, that random energy will be received at the several seismometers in phase, regardless of the arrangement of the seismometers with respect to each other or with respect to the source of seismic impulses. Actually, much of the random energy is received at one only of a pair of seismometers, and is therefore not recorded, since the product of the outputs representing this random energy is zero.

It will also be understood that by the use of the instant invention products of more than two voltages may be obtained. Thus circuits of the type shown in Figures 1 and 4 may be duplicated, each circuit effecting multiplication of two voltages. A third circuit may then be employed to obtain a product of the outputs of the first two circuits.

Figure 5 represents graphically a series of curves representing the grid voltage-plate current characteristics of valves of the general character shown in Figure 1. The difference in the shape of the several curves is the result of differences in the circuit constants selected, and the generally parabolic shape of all of the curves was obtained by suitable adjustment of the voltages applied to the several elements of the valves and primarily by the application of a substantially higher voltage to the high voltage grids 35 and 36 of the valves than is normally employed.

In general, it is desirable to employ a valve having at least three grids, the intended result being achieved by the application of negative bias voltage to the first and third grids and a relatively high positive voltage to the intermediate grid. Reference is made in this connection to my copending application Serial No. 338,440, filed concurrently herewith, in which is claimed various applications of a circuit containing only one of the valves disclosed herein.

In Figure 6 the upper portion of several of the curves appearing in Figure 5 is represented on a scale in which the ordinates are expanded. The close approximation of these curves, and particularly of the highest curve, to the parabolic form is at once apparent from this figure.

Having thus described the invention, what is claimed as new and desired to be secured by Letters Patent is:

1. In apparatus for use in seismic surveying in conjunction with at least two seismometers disposed at spaced points, the combination with a pair of thermionic valves, each of said valves delivering an output current which is proportional to the square of the input voltage, of means for applying to the respective valves voltages representative of the sum and difference of voltages proportional to the outputs of the respective seismometers, and indicating means operable by the output of said valves.

2. In apparatus for use in seismic surveying in conjunction with at least two seismometers disposed at spaced points, the combination with a pair of thermionic valves, each of said valves having operating characteristics such that the upper portion of the $E_g-I_p$ curve thereof is generally parabolic and being biased for operation substantially at the vertex of said curve, of means for supplying to said valves wave-form energy from said seismometers, and indicating means operable by the output of said valves.

3. A method of seismic surveying which comprises the steps of receiving seismic impulses at two points spaced in the direction of propagation thereof, converting said impulses into electrical wave-form energy, deriving therefrom electrical energy generally representative of the product of the energy received at said points, and recording said product energy.

4. In apparatus for use in seismic surveying in conjunction with at least two seismometers disposed at spaced points, the combination with a thermionic valve circuit delivering an output representative of the product of two input voltages, of means supplying such input voltages from said seismometers, and indicating means operable by the output of said valve circuit.

5. A method of seismic surveying which comprises the steps of receiving seismic impulses at spaced points, converting said impulses into electrical wave form energy, amplifying said energy, and combining and recording the amplified energy in a form proportional to the products of the instantaneous voltages of the converted energy.

6. In apparatus for use in seismic surveying, the combination with spaced seismometers for converting seismic impulses into electrical wave form energy, of a recording galvanometer having moving and fixed coils, and means supplying said moving and fixed coils with electrical wave form energy derived respectively from the two seismometers, whereby the record obtained from the moving coil is proportional to the products of such energy.

WILLIAM HARRY MAYNE.